(12) United States Patent
Mayr et al.

(10) Patent No.: US 6,891,710 B2
(45) Date of Patent: May 10, 2005

(54) METHOD FOR CONTROL OF A PROPORTIONAL MAGNET WITH A HOLD FUNCTION

(75) Inventors: Karlheinz Mayr, Bregenz (DE); Markus Eisele, Friedrichshafen (DE); Robert Ingenbleek, Kressbronn (DE); Walter Kill, Friedrichshafen (DE); Hubert Remmlinger, Friedrichshafen (DE); Jochen Fischer, Friedrichshafen (DE); Bernd Fessler, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 271 days.

(21) Appl. No.: 10/181,547

(22) PCT Filed: Jan. 23, 2001

(86) PCT No.: PCT/EP01/00678

§ 371 (c)(1),
(2), (4) Date: Jul. 18, 2002

(87) PCT Pub. No.: WO01/55807

PCT Pub. Date: Aug. 2, 2001

(65) Prior Publication Data

US 2003/0011454 A1 Jan. 16, 2003

(30) Foreign Application Priority Data

Jan. 29, 2000 (DE) .......................... 100 03 896

(51) Int. Cl.[7] .................................... H01H 47/00
(52) U.S. Cl. ................. 361/147; 361/154; 361/170; 361/143; 361/210; 361/142; 335/153; 335/202; 335/219
(58) Field of Search ......................... 361/147, 154, 361/170, 143, 210, 142; 335/153, 202, 219

(56) References Cited

U.S. PATENT DOCUMENTS

| 4,382,241 | A | * | 5/1983 | Hehl ..................... 335/153 |
| 5,650,909 | A | * | 7/1997 | Remele et al. .......... 361/154 |
| 5,673,165 | A | | 9/1997 | Kuhn et al. ............ 361/154 |
| 5,818,680 | A | | 10/1998 | Schmitz et al. ........ 361/160 |
| 5,822,167 | A | * | 10/1998 | Schmitz ................. 361/143 |
| 6,141,201 | A | | 10/2000 | Schmitz ................. 361/154 |
| 6,188,562 | B1 | | 2/2001 | Lutz et al. ............. 361/154 |

FOREIGN PATENT DOCUMENTS

| DE | 357 964 | 9/1922 | |
| DE | 35 06 053 A1 | 8/1986 | ............ H01F/7/16 |
| DE | 38 29 686 A1 | 3/1990 | ........... G05D/16/20 |
| DE | 39 05 937 A1 | 8/1990 | ............ H01F/7/18 |
| DE | 43 30 631 A1 | 3/1995 | ............ H01F/7/18 |
| DE | 44 30 867 A1 | 3/1996 | ............ H01F/7/18 |
| DE | 195 18 056 A1 | 6/1997 | ............ H01F/7/16 |
| DE | 195 44 207 A1 | 6/1997 | ............ H01F/7/18 |
| DE | 197 42 037 A1 | 3/1999 | ............ H01F/7/18 |
| DE | 198 07 875 A1 | 8/1999 | ............ H01F/7/18 |
| DE | 198 32 198 A1 | 1/2000 | ............ H01F/7/18 |
| DE | 199 04 901 A1 | 8/2000 | ............ H01F/7/13 |
| DE | 199 04 902 A1 | 8/2000 | ............ H01F/7/13 |
| EP | 0 233 168 A2 | 8/1987 | .......... G05D/16/20 |

* cited by examiner

*Primary Examiner*—Dean A. Reichard
*Assistant Examiner*—Anton Harris
(74) *Attorney, Agent, or Firm*—Davis & Bujold, P.L.L.C.

(57) ABSTRACT

Method for control of a proportional magnet comprising a magnet core, a magnet armature, a magnet coil for operating a control element in a shift valve or a proportional pressure-control valve, particularly a pressure-control valve for clutch operation in an automatic motor vehicle transmission, and comprising an electronic control device, whereby the magnet core may be moved back and forth between a control region and a hold region with a magnetic hold position of the magnet armature and a defined transition from the control region to the hold position may be executed and whereby mechanisms are provided for recognition of the movements of the magnet armature.

22 Claims, 8 Drawing Sheets

METHOD FOR CONTROL OF A PROPORTIONAL MAGNET WITH A HOLD FUNCTION

FIELD OF THE INVENTION

The invention relates to a method for control of a proportional magnet comprising a magnet core, a magnet armature, a magnet coil for operating a control element in a switch valve or a proportional pressure-control valve and an electronic control device. The invention particularly concerns a method for control of a proportional magnet in a proportional pressure-control valve for operating the clutch in an automatic motor vehicle transmission wherein the magnet armature can be moved back and forth between a control region and a hold region with magnetic hold position of the magnet armature and a defined transition from the control region to the hold position can be carried out.

The invention further relates to a proportional magnet for applying the method and a proportional pressure-control valve which contains the aforementioned proportional magnet.

BACKGROUND OF THE INVENTION

A proportional magnet of the above mentioned construction for use in a proportional pressure control valve has been disclosed, for example, in the Applicant's DE 199 04 901. In the publication is described one valve which is used for control of clutches in automatic motor vehicle mechanical transmissions (CE pressure regulator).

A similar proportional pressure-control valve, which likewise contains a proportional magnet of the above mentioned design, has been disclosed in the Applicant's DE 199 04 902. This document specially refers to valves which are used as direct control valves for the control of clutches in an automatic motor vehicle mechanical transmission (ZF pressure regulator).

These applications have respectively described proportional or hold magnets and switching magnets which implement a defined transition from the control region to a hold region or to a magnetic hold position. According to the prior art, this defined transition is attained by the fact that by the magnet characteristic known per se with great magnetic forces in small air gaps between the magnet armature and the magnet core and by suitable magnet layout, it is possible to adjust a coil current or a "snap current" under which the control region of the magnet is quickly overwound, that is, the magnet armature "snaps" from the control region to the hold position and the magnet armature is retained in the hold position in the region of the high magnetic force.

A movement in opposite direction, namely, the loosening of the proportional magnet from the hold region or the hold position and passage to the control region, hitherto could not be satisfactorily controlled according to the prior art.

The problem on which this invention is based is to outline a method which recognizes the movements of the magnet armature and thus can be used for defined disconnection of the proportional magnet or for loosening from the hold position a control element of a switch or proportional pressure-control valve connected therewith in order thus to implement a defined transition from the hold region, especially the hold position, to the control region. Also a problem to be solved by this invention is to outline a proportional magnet for carrying out the method, the same as a proportional pressure-control valve which contains such a proportional magnet.

This problem is solved with a method, a proportional magnet and a proportional pressure control valve.

SUMMARY OF THE INVENTION

For the method of controlling a proportional magnet, according to the invention means, which are provided recognize the movements of the magnet armature. Hereby is proposed a method which advantageously makes detectable every movement of the magnet armature in a proportional magnet. Thus can be detected both a movement of the magnet armature from the control region to the hold position and a movement in opposite direction.

The invention is based on the following physical effect, namely, that on one hand, the hold function of the magnet armature takes place in the region of higher magnetic forces and smaller air gaps in the electromagnet; this region is electrically identified by an increased inductivity. On the other hand, the loosening of the magnet armature from the magnet core induces a voltage which directly affects the coil current via the coil resistance.

In a proportional pressure-control valve, since the movements of the magnet armature essentially correspond to the movements of a control element of the valve, the inventive method advantageously makes controlling a proportional magnet possible of which several modes of application are described herebelow.

According to a development of the invention, the coil current is now made available as direct measuring signal in the electronic control device so that, without additional sensors, the displacement of the magnet armature can be recognized. The detection of the movement of the magnet armature is thus advantageously independent of tolerances of the parts and/or of environmental conditions.

In a specially advantageous development of the invention, it is proposed that the means recognize the loosening of the magnet armature from the hold position and by means of the electronic control device the magnet armature is transferred under control from the hold position to the control region. This results from the fact that the electronic control device recognizes the moment in which the magnet armature is loosened from the magnet core by a rise of the coil current. The current correction that thereafter sets in recovers the magnet armature during its loosening from the magnet core, that is, immediately after the loosening from the magnet core out of the hold position, the magnet armature is transferred under control by the current correction that sets in to the control region of the proportional magnet before the hydraulic pressure to be controlled by the proportional pressure-control valve collapses.

By the inventive means the complete shift of the magnet armature from the control region to the hold position obviously is also recognized by detecting an appertaining through snap limit current which, in turn, is used to calculate the recovery current.

It is thus advantageously possible also to electronically recognize, for example, in case of a main pressure collapse, an unintended complete shift of the magnet armature from the control to the hold regions and to introduce countermeasures.

In another design of the control method, it is proposed that a current threshold value standard I_Threshold be stored in the electronic control so that when exceeding said standard it is possible by the coil current to advantageously establish the moment the magnet armature is loosened from the magnet core.

Since the coil current is usually regulated, the current regulator thus acts actually opposite to the inventive effect, which means that the current nominal value I_Nominal for triggering the disconnecting function has to be selected so that the regulator remains in its lower regulated quantity limitation. This corresponds de facto to a disconnection of the regulator, since the current rise induced by the loosening of the magnet armature effects no further cutoff. After loosening of the magnet armature from the magnet core, an adequate current nominal value standard inventively results which advantageously occurs before the pressure to be controlled by the proportional pressure-control valve collapses, that is, that the control pressure drops to a value below the clutch closing pressure.

The proportional valve is designed with a shift valve body which advantageously has a geometric layout of the contact ratios of its control edges such that by means of the inventive method the loosening of the magnet armature is already established and the controlled guidance to the control region starts before the movement of the magnet armature or the valve body produces a hydraulic effect.

A method for control of a proportional pressure-control valve with a seat valve body has to be laid out for transmission utilizations so that the change of pressure occurring when loosening the armature is advantageously above the clutch hold pressure.

For detecting the movements of the magnet armature, different possible implementations can be used in principle which can be divided in hardware or software implementations, the same as in online and offline methods.

For the hardware implementation of the inventive method, it is proposed that the detection advantageously results by means of an ASIC (Application Specific Integrated Circuit).

In an advantageous development, it is proposed that individual peak values of the coil current be detected and that during loosening of the magnet armature the coil current be immediately raised again to a nominal value which keeps the shifting elements such as the clutch in a transmission at a safe closing pressure.

When the magnet armature is loosened from the magnet core, a binary signal is given to the electronic control device, particularly the electronic transmission control. Thereafter results due to the control device an adequate, for example, an adaptive, standard of a current nominal value.

According to one other advantageous design of the method, a software implementation of the detection of the movement of the magnet armature results by means of a model-based detection. The loosening of the magnet armature is detected here by a difference between the measured coil current and a simulated current calculated by means of a linear accompanying model.

A software implementation alternatively results by means of an observer-based detection of the armature velocity. Here the non-linear portion of the movement equation of the coil current is interpreted as interference level and thus the moment of loosening of the magnet armature is recognized.

In addition, the observer-based detection indicates an estimate of the armature velocity which can be used in a superimposed control circuit with a regulated quantity limitation for "recovery" of the magnet armature, especially in case of an online implementation.

The maximum coil current, which represents a regulated quantity of the velocity regulator, is here limited to the proportional region, that is, the control region of the magnet in order that the magnet armature does not snap back again to the hold position.

Alternatively to the above mentioned online method, a software implementation for the inventive method can also be advantageously used in one of the following offline methods.

It is thus possible, for example, on the production line end, after completion of the magnet or of the proportional pressure-control valve, to determine the characteristic parameters of the proportional magnet such as the time behavior of the disconnection operation or the current threshold values, particularly the limit current or the current amplitudes of the mutual induction, and to feed them to the appertaining electronic control device, particularly the electronic transmission control.

An an alternative to this, however, it is also possible to test the proportional magnet in every engine start of a motor vehicle equipped with an inventive proportional magnet, to evaluate the time interval between a voltage signal and a current rise. This is especially advantageous since said characteristic variables change during the lifetime of the motor vehicle.

The above mentioned designs and advantages of the inventive method for control of a proportional magnet are logically applicable also to a proportional magnet itself which is used to carry out the aforementioned method.

The proportional magnet, the detector and the layout of the disconnection function and the current regulator, the same as constructional parameters of the hydraulic subsystem and of the electronics, can be harmonized with each other as mechatronic total system.

In an advantageous development the invention is further proposed to equip a proportional pressure-control valve with a proportional magnet of the above described type. The pressure-control valve is here designed with a slide valve body which has a geometric layout of the contact ratio of the control edges such that the loosening of the magnet armature is already established and the controlled guidance to the control region starts before the movement of the magnet armature or of the control element produces a hydraulic effect.

In an alternative development of the proportional pressure-control valve, it is equipped with a seat valve body which, in turn, is geometrically laid out so that the hydraulic pressure appearing after loosening of the armature is higher than the clutch hold pressure.

BRIEF DESCRIPTION OF THE DRAWINGS

The invention will now be described, by way of example, with reference to the accompanying drawings in which.

DETAILED DESCRIPTION OF THE INVENTION

The path of a magnet armature (FIG. 1) in a proportional pressure-control valve can be essentially divided in a control region and a hold region, the largest stretch that can be covered of about 5.3 mm, for example, corresponding to the end position of the magnet armature on the magnet core. The region of about 2 to 4.5 mm is designated as control region of the magnet. In a constant coil current of 250 mA, for example, the magnetic force in the control region is at a constant value of about 20 N. In the hold region above 4.5 mm path of the magnet armature, the magnetic force increases superproportionally up to the stop or hold position. The magnetic force itself follows a hysteresis course so that a closing and opening of the magnet proceeds in substantially the same course.

Figure 1:
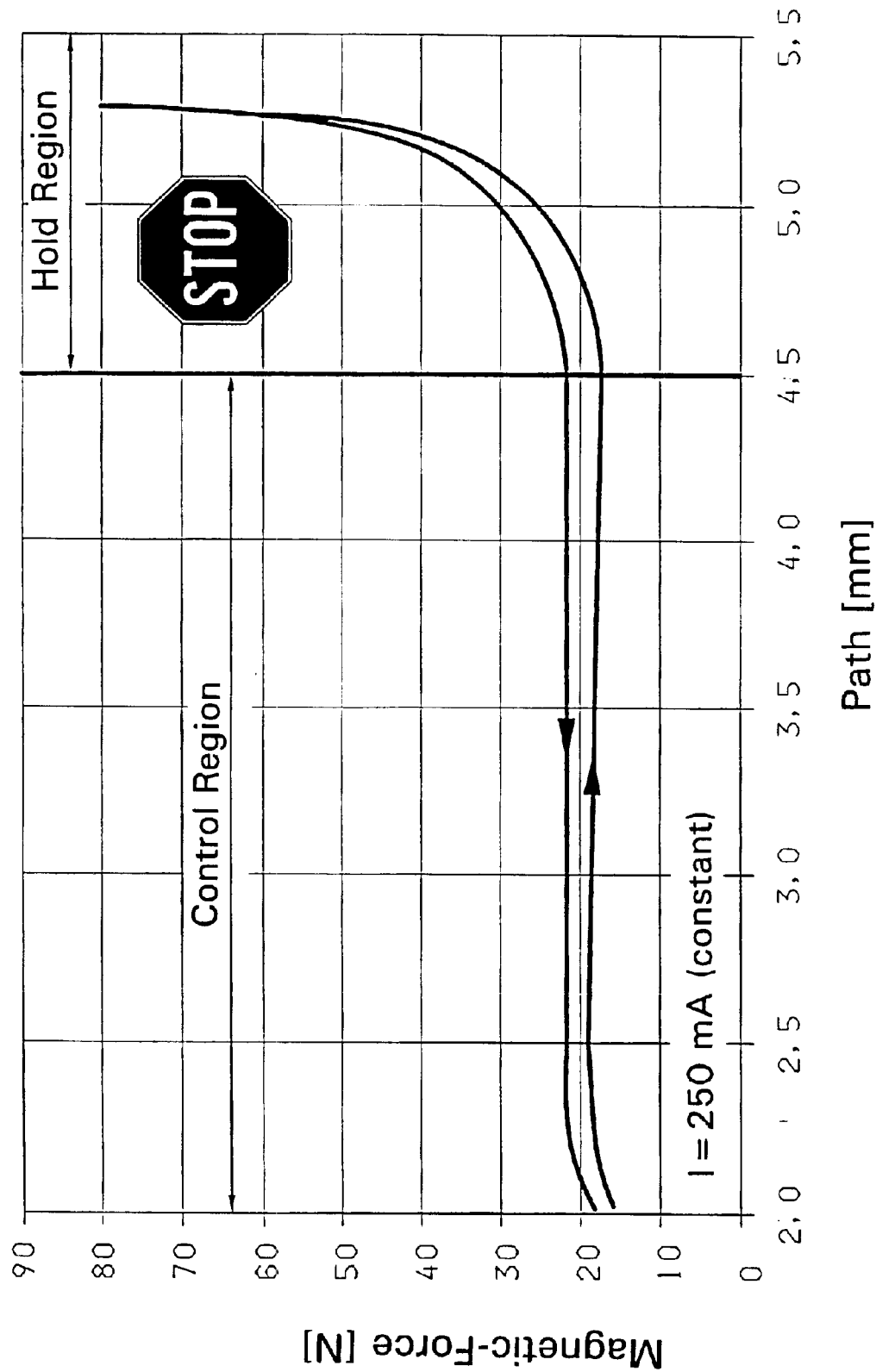
FIG. 1 is a magnetic force path characteristic line with control and hold regions.
Figure 2:
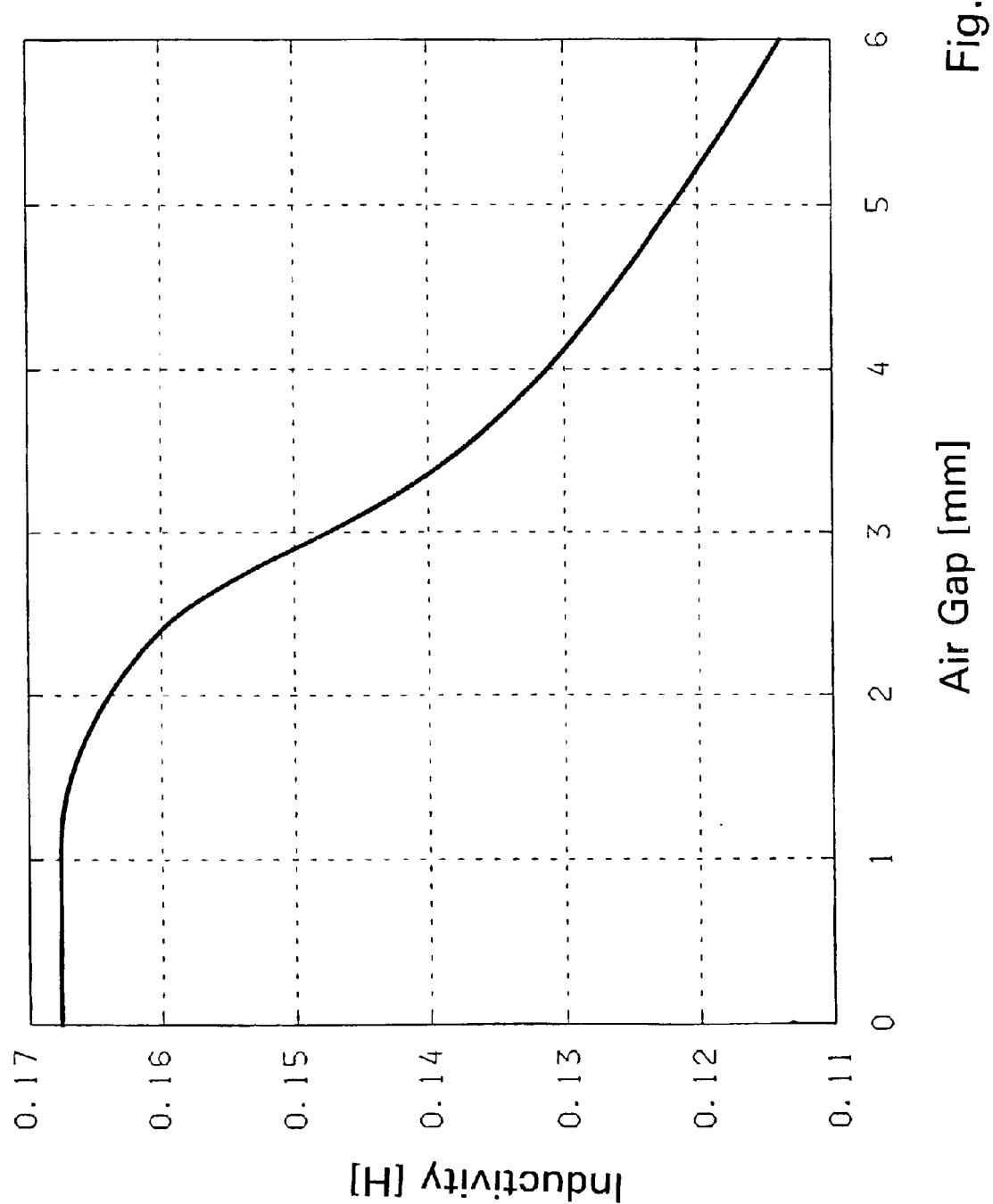
FIG. 2 is the inductivity characteristic line according to the air gap.

Inversely proportional to the path of the magnet armature according to FIG. 1, an air gap (FIG. 2) appears between the front side of the magnet armature and the magnet core, that is, the region of smaller air gaps is electrically identified by an increased inductivity which diminishes as the air gap increases, that is, with the loosening of the armature. The loosening of the armature then induces a time-dependent voltage which directly affects the coil current via the coil resistance.

Figure 3:
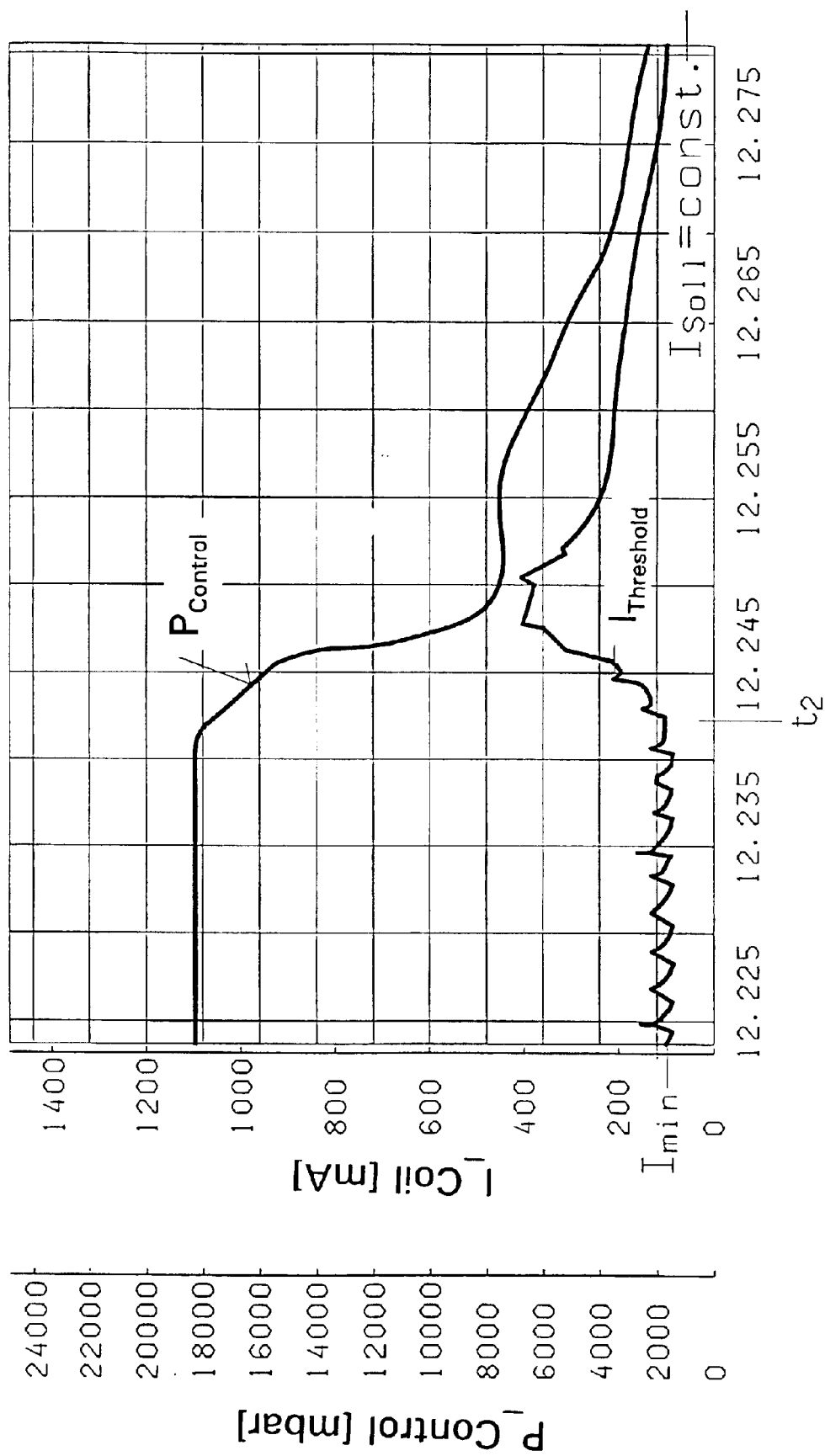
FIG. 3 is the curve of the control pressure and of the coil current during a disconnection operation according to time, as measuring diagram.

The coil current I_Coil behaves in proportion to the control pressure P_Control and is immediately made available in the electronic control device as measuring signal so that without additional sensors the path change of the armature according to FIG. 1 can be recognized. At the start of a disconnection operation (FIG. 3), the coil current is reduced from a maximum value not shown to a minimum value I_min which up to the t_2 moment is produced by a pulse-width modulated coil voltage U_Coil in the modulated curve I_Coil shown, five periods succeed in 10 msec so that this corresponds in this embodiment to a frequency of 500 Hz. During this time period until reaching t_2, the control pressure P_Control proceeds constantly to a value of about 18 bar. The current regulator is in its lower regulated quantity limitation so that this cannot further take back the regulated quantity. This is necessary in order that a rise of current caused by mutual induction, which is to be detected, is not washed off by the regulator. According to the invention, the movement of the armature, when the magnet drops, is recognizable by a rise of the coil current as a consequence of the mutual induction that sets in after the t_2 moment. With the proposed detector, said current is recognized according to a freely programmable threshold current I_Threshold whereby, in turn, the actual recovery (not shown here) is triggered. After detection of the threshold value, the coil current is taken back to a constant nominal value I_Nominal.

Figure 4:
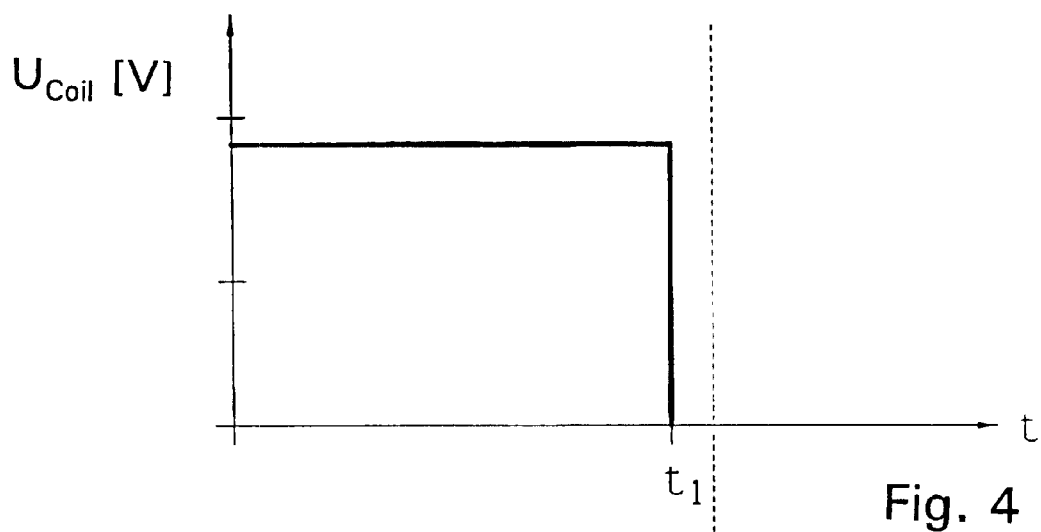
FIGS. 4, 5 and 6 are the curves of voltage, current, pressure and path during a disconnection operation as function of time.
Figure 5:
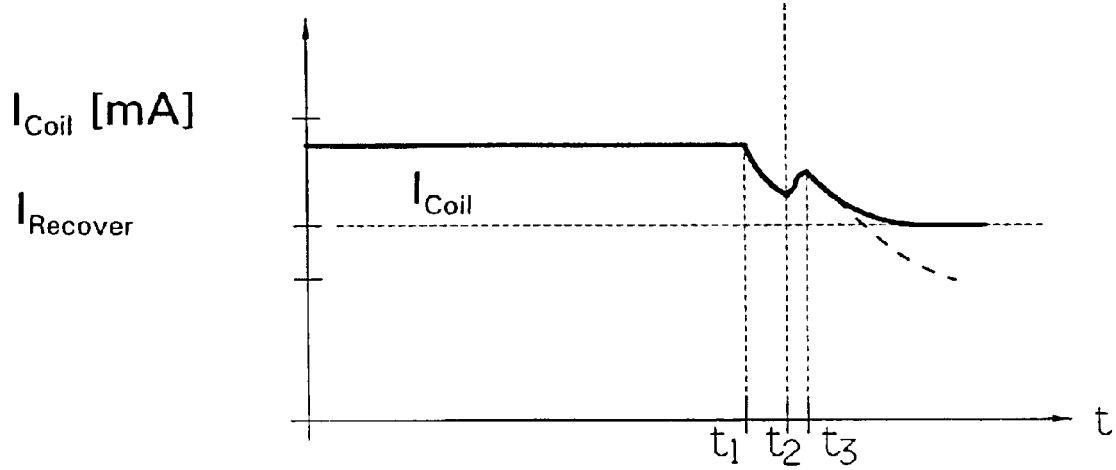
Figure 6:
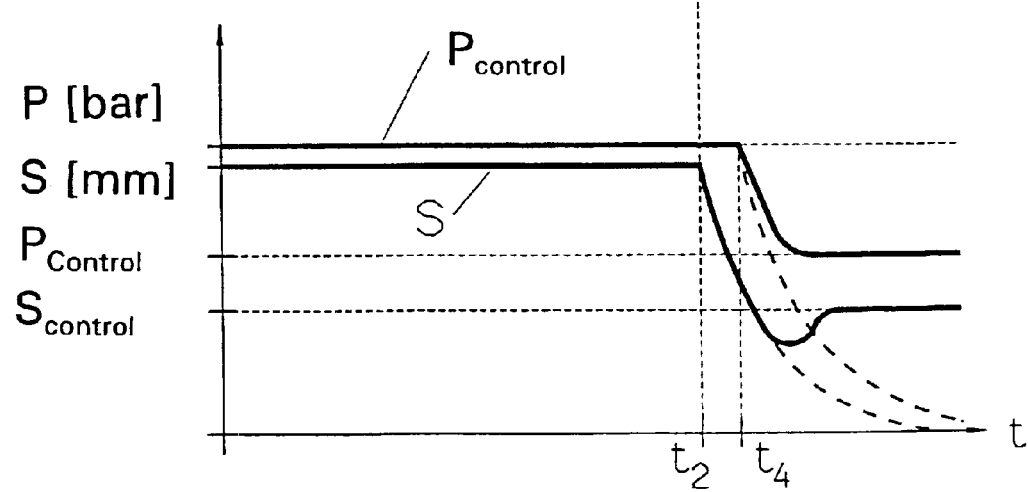

In a typical disconnection operation of a proportional magnet (FIGS. 4 to 6), the at first constant coil voltage U_Coil is disconnected at the t_1 moment. At the same t_1 moment (FIG. 5) also begins the reduction of the coil current I_Coil until the t_2 moment. At t_2, the mutual induction sets in so that the coil current is briefly magnified until the t_3 moment. According to the invention, the coil current is then recovered to a value I_Recover. Without the inventive recovery function, the coil current would drop to a value below I_Recover (dotted line).

The armature path S (FIG. 6) remains constant until reaching the t_2 moment, that is, the armature itself also does not move. After reaching t_2 at which the recovery function sets in, the armature begins to loosen itself from its position, which can be understood by the drop of the curve of the armature path S after t_2. By virtue of the recovery function the armature is trapped at value S_Control than kept constant. But without the inventive engagement in the coil current the curve of the armature path S would result along the dotted line.

The hydraulic control pressure P_Control of the proportional pressure-control valve is first at a constant value of 18 bar, for example. Only after the armature has covered a defined path, for example, at the t_4 moment, does the pressure collapse also set in. Without an engagement in the pressure control the hydraulic control pressure P_Control would drop substantially to a course along the dotted line. By an engagement in the coil current the control pressure is thus recovered to a value above 12 bar, for example.

Figure 7:
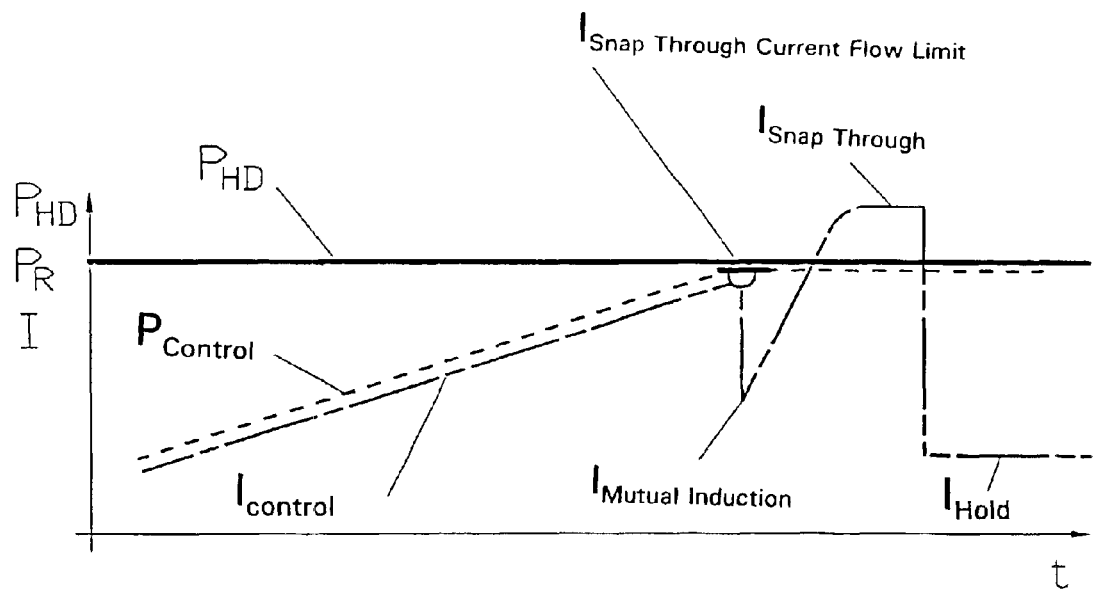
FIG. 7 is the curves of hydraulic main pressure, control pressure and control current as function of time for the transition from control to hold region.
Figure 8:
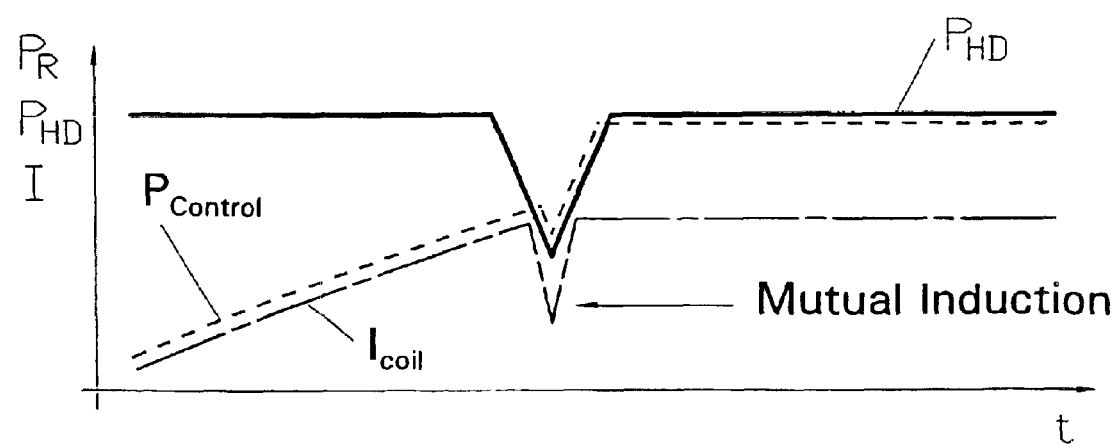
FIG. 8 is the curves according to FIG. 7 during a main pressure collapse.

Unlike the aforementioned Figures, FIGS. 7 and 8 describe the signal curves when fully shifting the magnet from the control to the hold region.

The curves of the hydraulic main pressure P_HD, of the control pressure P_Control are shown in FIG. 7. The hydraulic main pressure P_HD, also called system pressure, remains usually at a constant value. On the other hand, the control pressure P_Control likewise increases with the increasing control pressure P_Control until the control pressure substantially corresponds to the hydraulic main pressure. At this moment, a snap through current flow limit (I_Snap through current flow limit) is reached. The control pressure drops briefly as consequence of the mutual induction. The proposed detector can recognize the snap through current flow limit with the aid of said current collapse. This value can be used as basis for calculating the recovery current. Subsequently the control current is again raised to the snap through current, said snap through current being above the snap through current flow limit. After the snap through current has been reached, the snap through current is again gradually reduced down to the value of a hold current I-Hold which keeps in its stop position the magnet armature of a proportional pressure-control valve.

In a critical system state (FIG. 8), it is conceivable, for example, that the hydraulic main pressure P_HD collapses. This is identified by the steep drop and subsequent re-rise of the pressure curve. At the moment the pressure collapses, an unbalance generates between pressure force and magnetic force and an undesired transition to the hold function can result. But said snap through is also recognized by the proposed detector so that a recovery operation can be immediately introduced.

Figure 9:
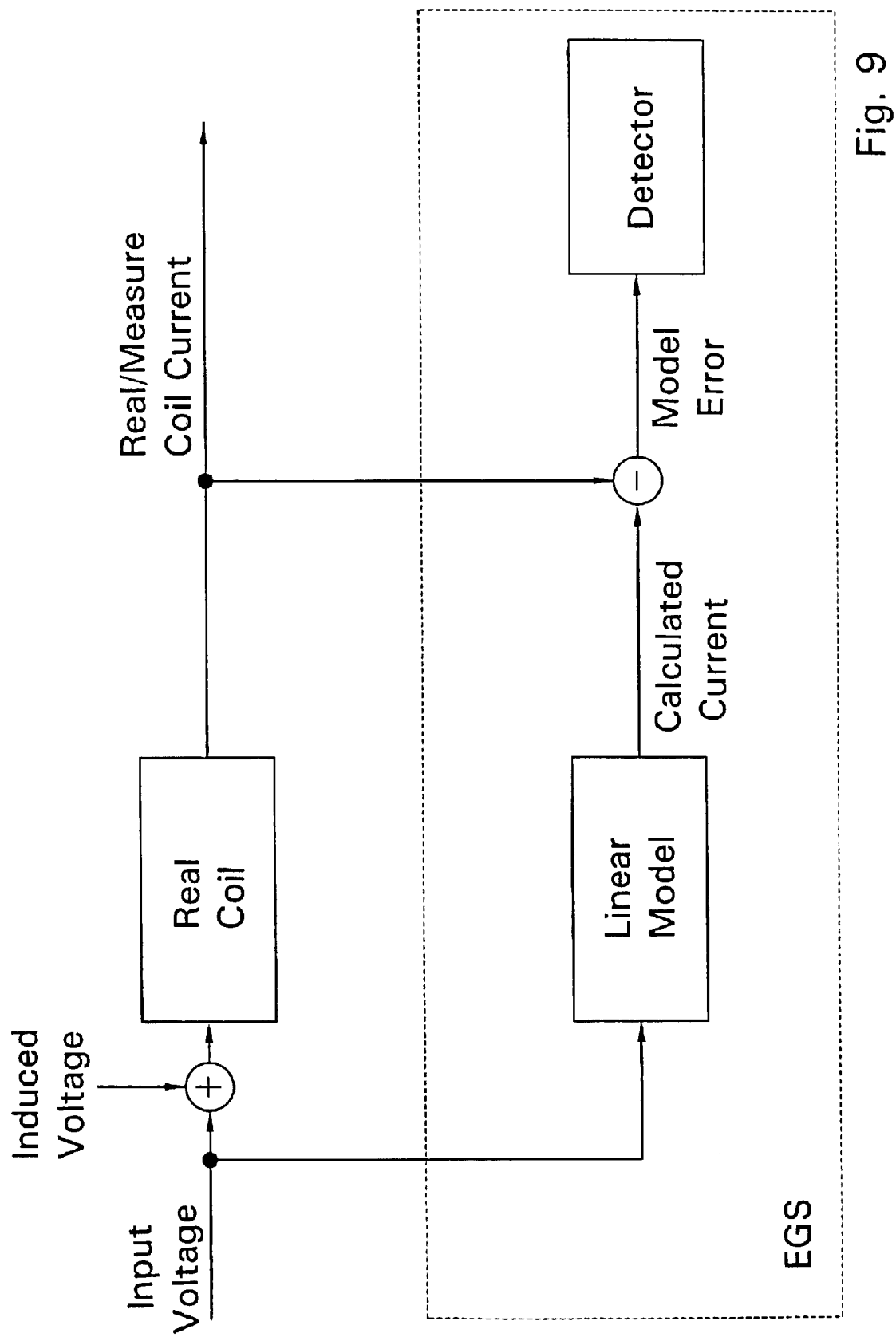
FIG. 9 is a diagrammatically shown model sequence detector.
Figure 10:
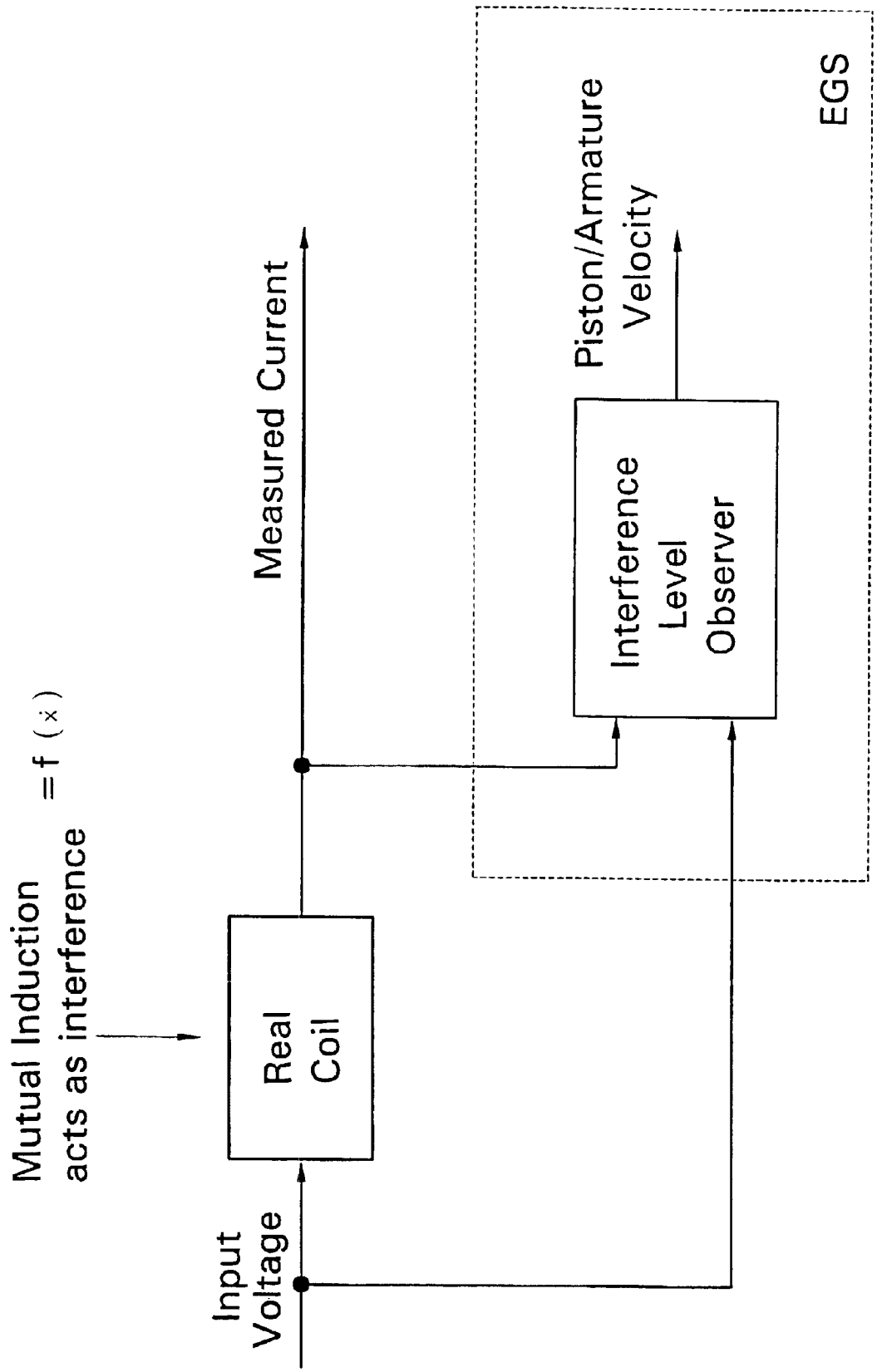
FIG. 10 is an diagrammatically shown interference level observer.

For the inventive detection of the armature movement in the switching operation different methods are conceivable in principle, it being possible to carry out the software implementation in a model-based detection with a linear accompanying model (FIG. 9) or in an observation-based detection of the armature velocity by means of an interference level observer (FIG. 10).

In the model-based detection (FIG. 9), a coil current is produced in a real coil by an input voltage which input voltage is superimposed by the induced voltage in the real system. The effect of the armature velocity upon the coil current can be shown here by a non-linear movement equation. A linear accompanying model does not take into account the induced voltage and upon disconnection of the input voltage delivers, starting from the maximum current, the same current curve as the measurement as long as the armature velocity is zero. In the difference between the measured and the simulated current in the linear model can be detected the armature movement, especially the breaking away of the armature. Both the linear accompanying model and the detector are included in the electronic transmission control EGS.

FIG. 10 alternatively describes the draft of the interference level observer that estimates the armature velocity from the measured coil current and the input voltage. The mutual induction is understood here as velocity-dependent interference level, said dependence being described in the observer.

Figure 11:
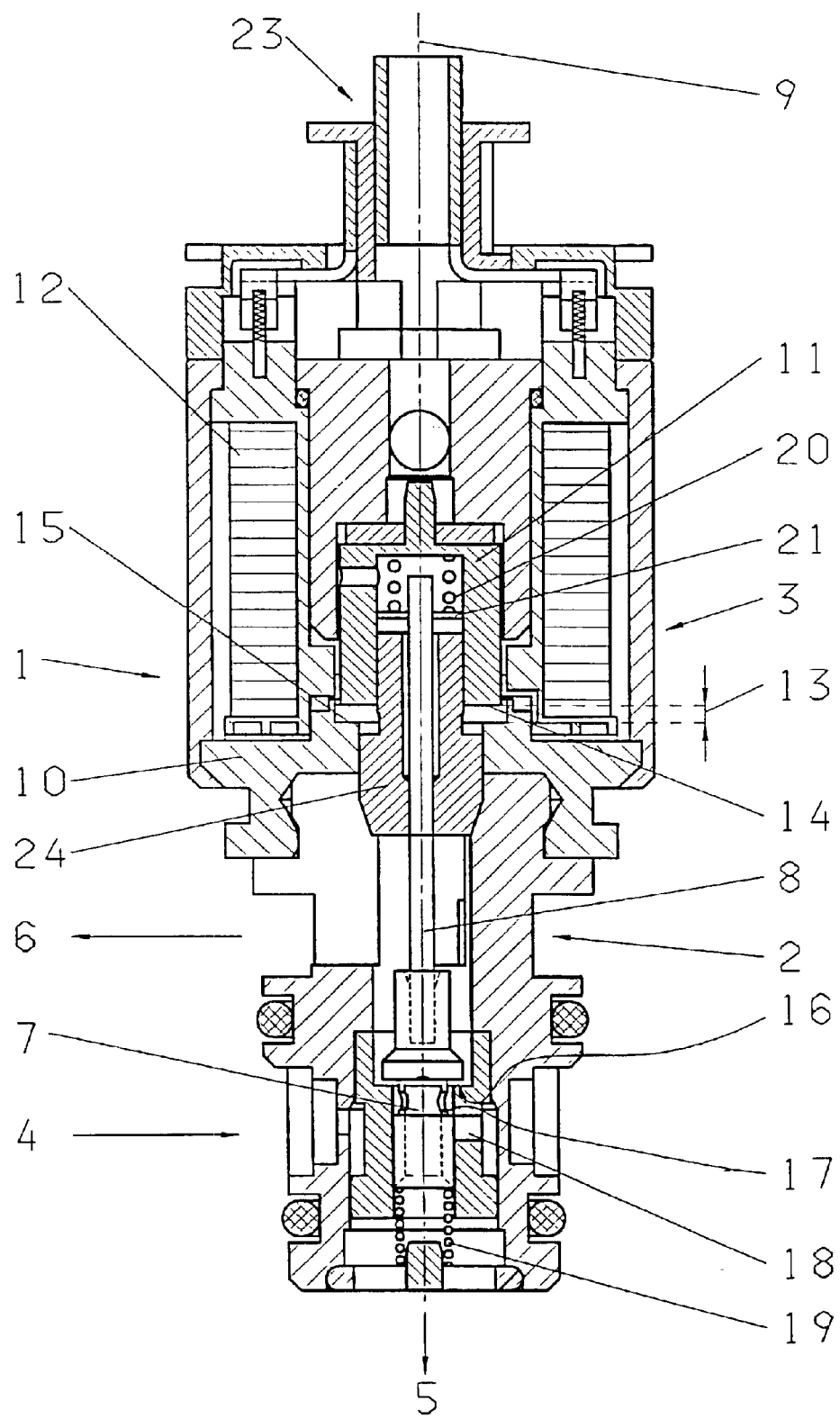
FIG. 11 is a 3/2-way proportional pressure-control valve with magnetic hold function of the magnet armature in CE (closed end) version in the longitudinal section.

The pressure-control valve 1 (FIG. 11) consists essentially of a valve housing 2 and a proportional magnet 3, the inlet and outlet openings 4, 5, 6 being located in the lower part of the valve housing 2. A control element 7 for opening and closing the valve seat 16 and sliding edge 17 is connected with an armature rod 8 which has an armature axis 9 and wherein the armature rod 8 is guided into a bushing 24 and one end of the armature rod 8 extends into the interior of a magnet armature 11. The magnet armature 11 forms together with a magnet core 10 and a magnet coil 32 the proportional magnet 3.

To connect the control element 7 with the proportional magnet 3, a disc 21 is fastened on said end of the armature rod 8. This end of the armature rod 8 with the disc 21 extend into a substantially cylindrical recess in the magnet armature 11. A spiral compression spring 20 is situated between the disc 21 and the bottom of the recess in the armature 11. A rigid connection is prevented between the armature rod 8 and the magnet armature 11. In the representation shown here, the magnet armature 11 is located in an end position, specifically the "upper" stop position, so that the distance 13 between the front side 14 of the magnet armature 11 and the front side 15 of the magnet core 10 is maximal. In the first end position, which corresponds to the hold position of the magnet armature 11, the distance 13 amounts to about 0 to 0.3 mm, preferably about <0.1 mm.

The control element 7 is thus moved by the magnet armature 11 via the compression spring 20 and the disc 21, on one side, to its first "lower" end position. In this hold position (not shown), the flat seat 16 is closed so that the hydraulic pressure outcropping on the inlet opening 4 cannot reach the outlet opening 6 via the three holes 18. An opening of the flat seat 16 is obtained by reducing the control current of the magnet coil and thereby also the magnetic hold force of the magnet armature 11 is withdrawn far enough so that the magnet armature 11 be loosened from the magnet core 10. The control current is then immediately accelerated again (grinding control) so that the "pressure collapse" cannot be traced in the precision adjustment range when the armature falls. The flat seat 16 can also be opened by raising the hydraulic main pressure within the inlet opening 4 and the annular duct 18 until the hydraulic force upon the "lower" annular face of the flat seat 16 is stronger than the magnetic hold force which retains the armature 11 upon the magnet core 10.

The proportional pressure-control valve 1 is connected, for example, by means of a coaxial plug 23, with an electric control device EGS (not shown).

| Reference numerals | |
|---|---|
| 1 | proportional pressure-control valve |
| 2 | valve housing |
| 3 | proportional magnet |
| 4 | inlet opening |
| 5 | connection for control pressure |
| 6 | outlet opening |
| 7 | control element, valve body |
| 8 | armature rod |
| 9 | armature axis |
| 10 | magnet core |
| 11 | magnet armature |
| 12 | magnet coil |
| 13 | distance |
| 14 | front side magnet armature |
| 15 | front side magnet core |
| 16 | flat seat |
| 17 | sliding edge |
| 18 | hole |
| 19 | spring |
| 20 | compression spring |
| 21 | disc |
| 23 | coaxial plug |
| 24 | bushing |
| I_Coil | coil current |
| I_min | minimum current |
| I_Threshold | threshold current |
| I-Recover | recovery current |
| I_Control | control current |
| I_Hold | hold current |
| I_Nominal | nominal current |
| U_Coil | coil current |
| P_Control | control pressure |
| P_HD | hold pressure |
| t_1 | moment |
| t_2 | moment |
| t_3 | moment |
| t_4 | moment |
| S | armature path |
| EGS | electronic transmission control |

What is claimed is:

1. A method for the control of a proportional magnet (3) comprising a magnet core (10), a magnet armature (11); and a magnet coil (12) for use to operate a clutch in an automatic vehicle transmission, the method comprising the steps of:
   (i) connecting the proportional magnet (3) with an electronic control device (EGS) for operating a control element (7) in one of a shift valve arid a proportional pressure-control valve (1);
   (ii) moving the magnet armature (11) back and forth between a control region and a magnetic hold position of the magnet armature (11) and
   (iii) defining a transition from the control region to hold position, wherein means are provided which recognize the movement of said magnet armature (11) from the hold position, and for transferring the magnet armature under control from the hold position to the control region.

2. The method according to claim 1, further comprising the step of providing a coil current (I_Coil), that is a direct measuring signal of a position of the magnet armature, to the electronic control device.

3. The method according to claim 1, further comprising the steps of transforming the magnet armature (11) under-control from the hold position to the control region by means of the electronic control device.

4. The method according to claim 1, further comprising the steps of recognizing the complete shift of the magnet armature (11) from the control region to the hold position and by means of the electronic control device detecting a limit current (I_Snap through current flow limit) for use to calculate a recovery current (I_Recover).

5. The method according to claim 4, further comprising the steps of recognizing an unintended complete shift from the control to the hold region.

6. The method according to claim 1, further comprising the steps of storing a current threshold value standard (I_Threshold), the electronic transmission control (EGS) so that when said standard s exceeded the moment of loosening of the magnet armature (11) can be established.

7. The method according to claim 6, further comprising the steps of that a correction of the coil current (I_Coil) takes place after loosening of the magnet armature (11) from the magnet core (10).

8. The method according to claim 6, wherein the proportional pressure-control valve (1) is a sliding valve body having such a geometric layout of an overlap ratio of the body control edges that the loosening of the magnet armature (11) is established and the controlled guidance in the control region begins before the movement of one of the magnet armature (11) and the valve body (7) produces a hydraulic effect.

9. The method according to claim 6, wherein proportional pressure-control valve has a seat valve body geometrically laid out so that hydraulic pressure (P_Control) appearing after loosening of the magnet armature (11) stronger than the clutch hold pressure.

10. The method according to claim 1, further comprising the steps of detecting movement of the magnet armature (11) is implemented in one of hardware and in software.

11. The method according to claim 10, wherein hardware implementation of the detection takes place by means of an ASIC.

12. The method according to claim 11, further comprising the steps or detecting individual peak values of the coil current (I_Coil) are detected and during loosening of the magnet armature (11) the coil current (I_Coil) is immediately raised again to a nominal value (I_Nominal) which holds the shifting elements at a reliable dosing pressure.

13. The method according to claim 1, further comprising the steps of detecting individual peak values of coil currant (I_Coil) and during loosening of the magnet armature (11) there is produced a binary signal in the electronic transmission control (EGS) which thereafter provides a suitable standard of a current nominal value (I_Nominal).

14. The method according to claim 10, wherein software implementation takes place by means of a model-based detection wherein the loosening of the magnet armature (11) is detectable by a different between the measured coil current (I_Coil_measured) and a simulated current (I_Coil_calculate) calculated by means of a linear accompanying model.

15. The method according to claim 14 further comprising the steps of detecting the movements of the magnet armature (11) by means of a sensor.

16. The method according to claim 15, wherein software implementation by means of a sensor-based detection of the armature velocity results wherein the non-linear portion of the movement equation of the coil current (I_Coil_non-linear) is interpreted as interference level and the moment (t_2) of loosening of the magnet armature (11) is recognized.

17. The method according to claim 16, wherein the sensor-based detection indicates an estimate value of the armature velocity which can be used in a superimposed control circuit with a regulated quantity limitation for recovery of the magnet armature (11), in an online implementation.

18. The method according to claim 14, comprising using the software implementation in an offline method.

19. The method according to claim 18, wherein the characteristic parameters of the proportional magnet (3) such as the time behavior of the disconnection operation or current threshold values are determined on the production line and after completion of the magnet and fed into the appertaining electronic transmission control (EGS).

20. The method according to claim 19, wherein at every start of a motor vehicle engine equipped with the proportional magnet (3), the proportional magnet (3) is tested by evaluating the time interval between a voltage signal and the current rise (t_2-t_1).

21. A proportional magnet (3) for applying a method according to claim 1 comprising a magnet core (10), a magnet armature (11), a magnet coil (12)

wherein the proportional magnet (3) is connected with an electronic control device (EGS) for operating a control element (7) in a shift valve o a proportional pressure-control valve (1), operating the clutch in an automatic motor vehicle transmission, and the magnet armature (11) is movable back and forth between a control region and a hold region with a magnetic hold position of the magnet armature (11) and a defined transition from the control region to the hold position is practicable, wherein a signal is generated according to the movements of the magnet armature (11) including the loosening from the hold position, and the magnet armature (11) can be transferred under control from the hold position to the control region; and wherein the magnet armature (11) can be transferred under control from the hold position to the control region by means of the electronic control device directly receiving the signal generated by the movements of the magnetic armature.

22. A method for the control of a proportional magnet (3) comprising a magnet core (10), a magnet armature (11); and a magnet coil (12) for use to operate a clutch in an automatic vehicle transmission, the method comprising the steps of:

(i) connecting the proportional magnet (3) with an electronic control device (EGS) for operating a control element (7) in one of a shift valve and a proportional pressure-control valve (1);

(ii) moving the magnet armature (ii) back and forth between a control region where a coil current supplied to the magnet coil is maintained substantially constant, and a magnetic hold position of the magnet armature where the coil current is significantly raised (11);

(iii) defining a transition from the control region to hold position, wherein means are provided which recognize the movement of said magnet armature (11) from the hold position, and for transferring the magnet armature under control from the hold position to the control region; and (iv) sensing the coil current (I_Coil), and sending the sensed coil current as a direct measuring signal of a position of the magnet armature to the electronic control device to determine a current correction to controllably transfer the magnet armature from the hold region to the control region and prevent hydraulic pressure collapse.

* * * * *